(12) United States Patent
Tajiri

(10) Patent No.: US 8,677,858 B2
(45) Date of Patent: Mar. 25, 2014

(54) STEERING WHEEL AND MANUFACTURING METHOD OF STEERING WHEEL

(75) Inventor: Yuji Tajiri, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 1073 days.

(21) Appl. No.: 12/421,220

(22) Filed: Apr. 9, 2009

(65) Prior Publication Data

US 2009/0255367 A1 Oct. 15, 2009

(30) Foreign Application Priority Data

Apr. 15, 2008 (JP) ................................. 2008-105271

(51) Int. Cl.
*B32B 37/18* (2006.01)
*B62D 1/04* (2006.01)
*B62D 1/06* (2006.01)

(52) U.S. Cl.
CPC ....................................... *B62D 1/06* (2013.01)
USPC ............... 74/552; 74/558; 29/894.1; 264/449

(58) Field of Classification Search
USPC .......................... 74/552, 558, 558.5; 29/894.1
IPC ....................................................... B62D 1/06
See application file for complete search history.

(56) References Cited

U.S. PATENT DOCUMENTS

| | | | | |
|---|---|---|---|---|
| 3,209,615 A | * | 10/1965 | Fosnaugh et al. | ................ 74/552 |
| 6,038,770 A | * | 3/2000 | Carrier | .......................... 29/894.1 |
| 6,282,982 B1 | * | 9/2001 | Testa | ................................. 74/558 |
| 6,524,515 B1 | * | 2/2003 | Cavalli | ........................... 264/449 |
| 6,578,448 B2 | | 6/2003 | Suzuki et al. | |
| 6,651,526 B1 | * | 11/2003 | Imaizumi et al. | ................ 74/552 |
| 6,698,311 B2 | | 3/2004 | Suzuki et al. | |
| 6,817,100 B2 | | 11/2004 | Mori et al. | |
| 7,478,477 B2 | * | 1/2009 | Hayashi et al. | ............... 29/894.1 |
| 2002/0011130 A1 | * | 1/2002 | Suzuki et al. | .................... 74/552 |
| 2006/0053956 A1 | * | 3/2006 | Kreuzer | ........................... 74/552 |
| 2011/0197701 A1 | * | 8/2011 | Bodebratt et al. | .............. 74/552 |

FOREIGN PATENT DOCUMENTS

| | | |
|---|---|---|
| CN | 1175528 A | 3/1998 |
| JP | 2000127982 A | 5/2000 |
| JP | 2002-19618 A | 1/2002 |

OTHER PUBLICATIONS

Machine translation of JP 2000-127982 A; May 9, 2000.*
Adhesives for Bonding Wood to Metal, US Dept. of Agriculture, Forest Service, Forest Products Lab., Madison, Wis., Dec. 1964.*

(Continued)

*Primary Examiner* — Vinh Luong
(74) *Attorney, Agent, or Firm* — Roberts Mlotkowski Safran & Cole P.C.

(57) ABSTRACT

A steering wheel and steering wheel manufacturing method are provided in which misalignment of the relative position of the wood member and the metal core can be prevented or suppressed in the period until the elastic adhesive is cured.
A wood member and a rim metal core portion are bonded by an elastic adhesive being present between the wood member and the rim metal core portion. Spacer members are disposed between the wood member and the rim metal core portion so as to position the wood member relative to the rim metal core portion. Consequently, misalignment of the relative position of the wood member and the rim metal core portion is suppressed by the spacer members during the period until the elastic adhesive is cured.

9 Claims, 5 Drawing Sheets

(56) References Cited

OTHER PUBLICATIONS

English Abstract of Office Action issued by the State Intellectual Property Office of People's Republic of China in corresponding Chinese Application No. 200910133637.7.

Japanese Office Action dated May 15, 2012 and English translation of the Notice of Reasons for Rejection.

* cited by examiner

STEERING WHEEL AND MANUFACTURING METHOD OF STEERING WHEEL

CROSS-REFERENCE TO RELATED APPLICATION

This application claims priority under 35 USC 119 from Japanese Patent Application No. 2008-105271, the disclosure of which is incorporated by reference herein.

BACKGROUND OF THE INVENTION

1. Field of the Invention

The present invention relates to a steering wheel with attached wooden member and a manufacturing method of a steering wheel with attached wooden member.

2. Related Art

In steering wheels for vehicles there are cases where a wooden member is attached, such as for decoration, so as to cover a portion of a rim metal core portion fixed to a steering shaft (see, for example, Japanese Patent Application Laid-Open (JP-A) No. 2002-19618). When manufacturing such a steering wheel, for example, the wooden member is assembled to the rim metal core portion via an elastic adhesive by, after applying an elastic adhesive on a grooved portion of a pair of wooden pieces configuring the wooden member, joining the pair of wooden pieces together with the rim metal core portion accommodated within the wooden member.

SUMMARY OF THE INVENTION

The present invention provides a steering wheel and steering wheel manufacturing method in which misalignment of the relative position of the wood member and the metal core can be prevented or suppressed for the period until the elastic adhesive is cured.

A first aspect of the present invention is a steering wheel including: a metal core that is fixed to a steering shaft of a vehicle; a wooden member that accommodates the metal core therein; an adhesive that is interposed between the wooden member and the metal core, and bonds the wooden member and the metal core; and spacer members that are disposed between the wooden member and the metal core, and positions the wooden member with respect to the metal core.

According to the steering wheel of the first aspect of the present invention, the adhesive is interposed between the wooden member and the metal core, bonding the wooden member and the metal core, and the spacer members are disposed so as to position the wooden member with respect to the metal core, and consequently, misalignment of the relative position of the wood member and the metal core is suppressed for the period until the adhesive is cured.

In the steering wheel of a second aspect of the present invention in the first aspect, the coefficient of elasticity of the spacer members is set to be the same as, or lower than, the coefficient of elasticity of the adhesive.

According to the steering wheel of the second aspect of the present invention, the coefficient of elasticity of the spacer members is set to be the same as, or lower than, the coefficient of elasticity of the adhesive, and consequently reaction force from the spacer members is suppressed when a load acts on the adhesive and the spacer members.

In the steering wheel of a third aspect of the present invention in the first aspect or of the second aspect, the spacer members are disposed at points between the wooden member and the metal core.

According to the steering wheel of the third aspect of the present invention, the spacer members are disposed at points (sprinkled) between the wooden member and the metal core, and consequently reaction force from the spacer members is suppressed when a load acts on the adhesive and the spacer members.

In the steering wheel of the first aspect of the present invention, it is possible that the spacer members are formed of the same material as the adhesive.

Further, in the steering wheel of the first aspect of the present invention, it is possible that the wooden member is configured by a plurality of wooden pieces and grooved portions configuring an internal face of the wooden member are respectively formed in the plurality of wooden pieces, and the spacer members are disposed between the metal core and only the grooved portion of one of the plurality of wooden pieces.

Further, in the steering wheel of the first aspect of the present invention, it is possible that the wooden member is configured by a plurality of wooden pieces and grooved portions configuring an internal face of the wooden member are respectively formed in the plurality of wooden pieces, and the spacer members are disposed between the metal core and the grooved portion of one of the plurality of wooden pieces, and between the metal core and the grooved portion of another of the plurality of wooden pieces.

Further, in the steering wheel of the first aspect of the present invention, it is possible that the spacer members are disposed at vicinity of at least one of corner portions or apex portions of the metal core or at vicinity of portions of the wooden member corresponding to the at least one of corner portions or apex portions of the metal core in the cross sectional view of the metal core.

A fourth aspect of the present invention is a manufacturing method of a steering wheel including: a metal core that is fixed to a steering shaft of a vehicle; a wooden member that accommodates the metal core therein; an adhesive that is interposed between the wooden member and the metal core and bonds the wooden member and the metal core; and spacer members that are disposed between the wooden member and the metal core, and position the wooden member with respect to the metal core, the wooden member being configured by a plurality of wooden pieces, and grooved portions configuring an internal face of the wooden member being respectively formed in the plurality of wooden pieces, the manufacturing method including: a spacer member attaching process in which the spacer members are attached to at least one of the metal core or to the grooved portion; a applying process in which the adhesive is applied in a pre-cured state thereof to at least one of the metal core or to the grooved portions; and an assembly process in which, after the spacer attaching process and the applying process, the plurality of wooden pieces are joined together so as to accommodate the metal core within the wooden member.

In the manufacturing method of the steering wheel of the fourth aspect of the present invention, in the spacer attaching process the spacer members are attached to at least one of the metal core and the grooved portion, in the applying process the adhesive is applied in a pre-cured state to at least one of the metal core or the grooved portions, and in the assembly process, after the spacer attaching process and the applying process, the plural wooden pieces are joined together so as to accommodate the metal core within the wooden member. When this is carried out the wooden member is positioned relative to the metal core by the spacer members, and consequently misalignment of the wood member relative to the metal core is suppressed in the period until the adhesive is cured.

In the manufacturing method of the steering wheel of a fifth aspect of the present invention in the fourth aspect, the coefficient of elasticity of the spacer members is set to be the same as, or lower than, the coefficient of elasticity of the adhesive in a cured state thereof.

According to the manufacturing method of the steering wheel of the fifth aspect of the present invention, the coefficient of elasticity of the spacer members is set to be the same as, or lower than, the coefficient of elasticity of the adhesive after curing, and consequently reaction force by the spacer members is suppressed when a load acts on the adhesive and the spacer members.

In the manufacturing method of the steering wheel of the fourth aspect of the present invention, it is possible that in spacer member attaching process, the spacer members are disposed at points between the wooden member and the metal core.

Further, in the manufacturing method of the steering wheel of the fourth aspect of the present invention, it is possible that the spacer members are formed of the same material as the adhesive.

Further, in the manufacturing method of the steering wheel of the fourth aspect of the present invention, it is possible that in the spacer member attaching process, the spacer members are disposed between the metal core and only the grooved portion of one of the plurality of wooden pieces.

Further, in the manufacturing method of the steering wheel of the fourth aspect of the present invention, it is possible that in the spacer member attaching process, the spacer members are disposed between the metal core and the grooved portion of one of the plurality of wooden pieces, and between the metal core and the grooved portion of another of the plurality of wooden pieces.

Further, in the manufacturing method of the steering wheel of the fourth aspect of the present invention, it is possible that in the spacer member attaching process, the spacer members are disposed at vicinity of at least one of corner portions or apex portions of the metal core or at vicinity of portions of the wooden member corresponding to the at least one of corner portions or apex portions of the metal core in the cross sectional view of the metal core.

Further, in the manufacturing method of the steering wheel of the fourth aspect of the present invention, it is possible that in spacer member attaching process, the spacer members that are cured in advance are attached to at least one of the metal core or to the grooved portion.

Further, in the manufacturing method of the steering wheel of the fourth aspect of the present invention, it is possible that in the assembly process, the metal core is accommodated within the wooden member in a state where the one of the plurality of wooden pieces in which the spacer members are disposed is set in a lower side and the other of the plurality of wooden pieces in which the spacer members are not disposed is set in an upper side.

As explained above, the steering wheel of the first aspect of the present invention has the excellent effect in that misalignment of the relative position of the wood member and the metal core can be prevented or suppressed for the period until the adhesive is cured.

The steering wheel of the second aspect of the present invention has the excellent effect in that reaction force by the spacer members can be suppressed when a load acts on the adhesive and the spacer members.

The steering wheel of the third aspect of the present invention has the excellent effect in that reaction force from the spacer members can be suppressed when a load acts on the elastic adhesive and the spacer members.

The manufacturing method of the steering wheel of the fourth aspect of the present invention has the excellent effect in that misalignment of the relative position of the wood member and the metal core can be prevented or suppressed for the period until the adhesive is cured.

The manufacturing method of the steering wheel of the fifth aspect of the present invention has the excellent effect in that reaction force from the spacer members can be suppressed when a load acts on the adhesive and the spacer members.

BRIEF DESCRIPTION OF THE DRAWINGS

Exemplary embodiments of the present invention will be described in detail based on the following figures, wherein:

FIGS. 3A to 3C are process diagrams showing a manufacturing method of a steering wheel according to the first exemplary embodiment of the present invention, wherein FIG. 3A is of a spacer attachment process, FIG. 3B is of a coating process, and FIG. 3C is of an assembly process;

FIGS. 5A to 5C are process diagrams showing a manufacturing method of a steering wheel according to the second exemplary embodiment of the present invention, wherein FIG. 5A is of a spacer attachment process, FIG. 5B is of a coating process, and FIG. 5C is of an assembly process.

DETAILED DESCRIPTION OF THE INVENTION

First Exemplary Embodiment

Explanation will now be given of a steering wheel and steering wheel manufacturing method according to a first exemplary embodiment of the present invention, with reference to FIG. 1 to FIGS. 3A to 3C.

Figure 1:
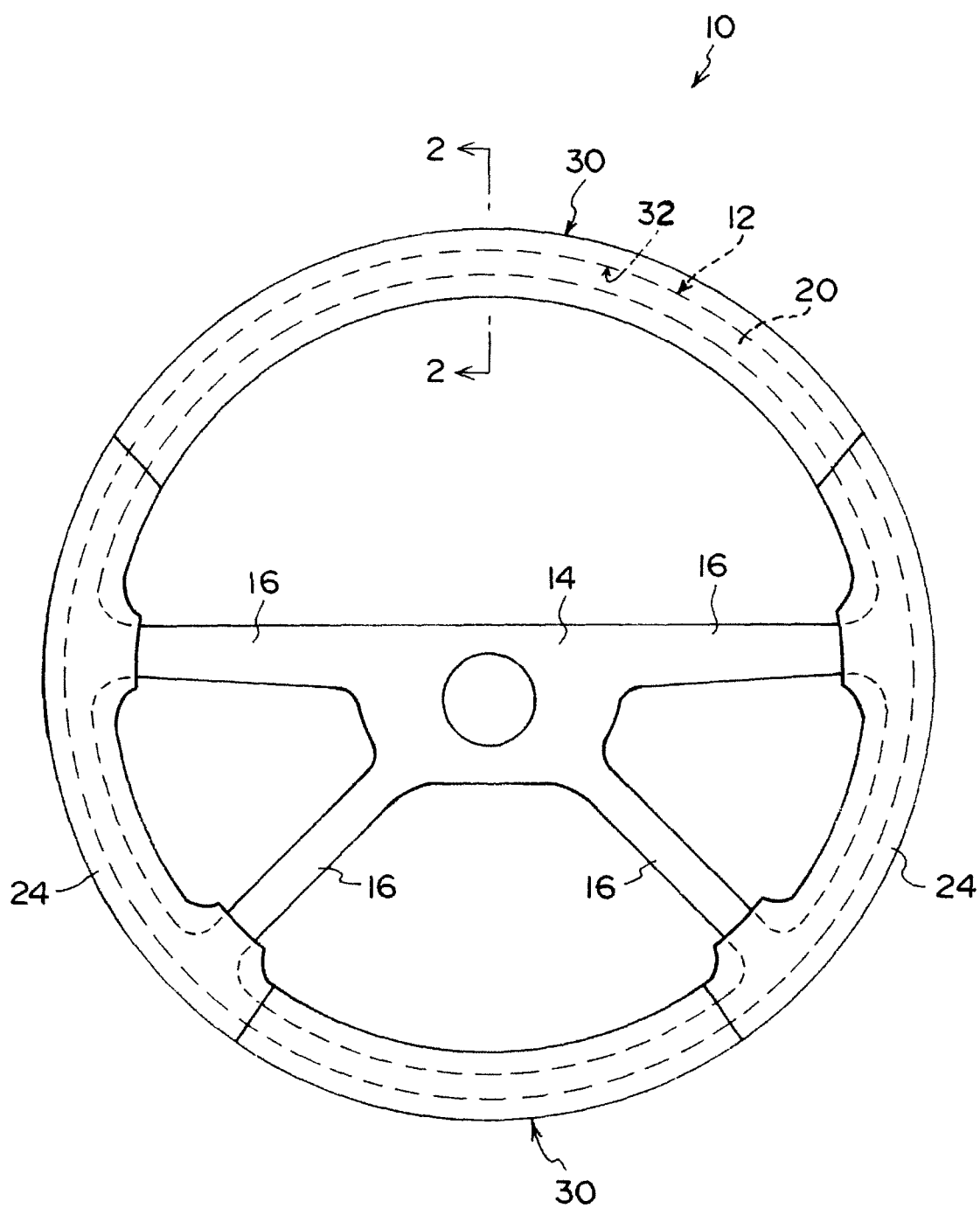
FIG. 1 is a front elevation showing a steering wheel according to a first exemplary embodiment of the present invention.
Figure 2:
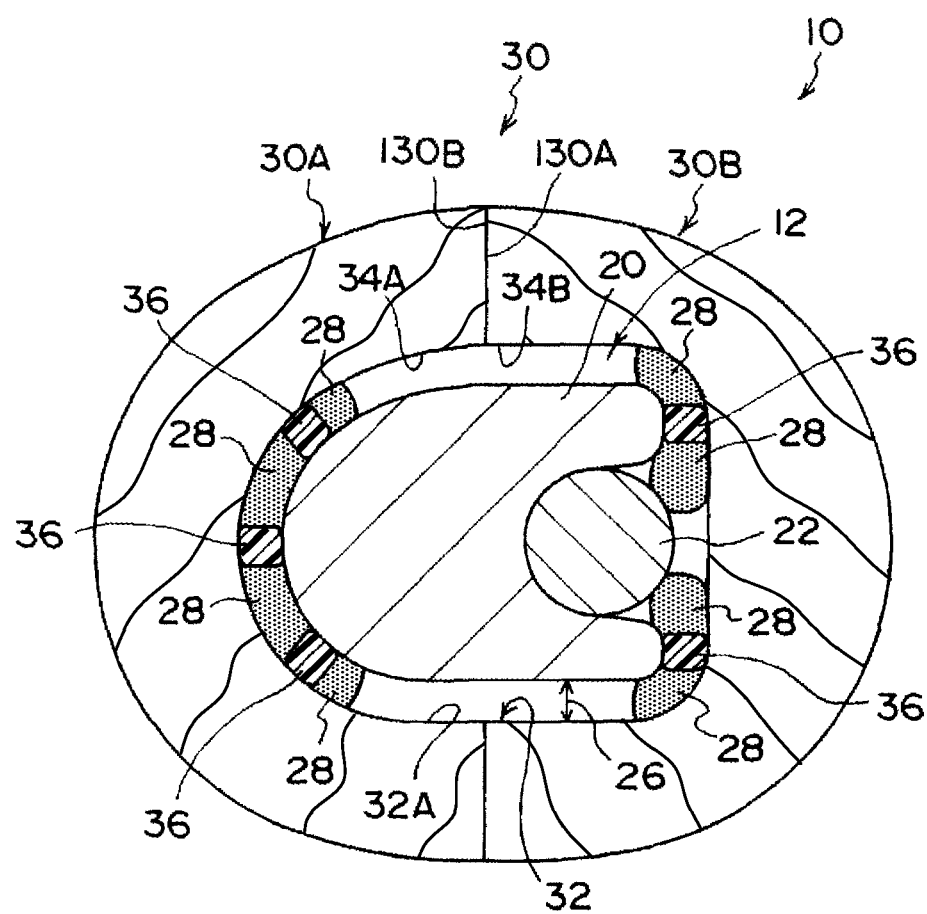
FIG. 2 is a cross-section showing some important elements of a steering wheel according to the first exemplary embodiment (an expanded schematic configuration taken along line 2-2 in FIG. 1)

A front view of a steering wheel 10 is shown in FIG. 1, and a cross-section showing some important elements of a steering wheel 10 according to the first exemplary embodiment (an expanded schematic configuration taken along line 2-2 in FIG. 1) is shown in FIG. 2. As shown in FIG. 1 the steering wheel 10 is provided with a metal core 12. The metal core 12 is formed by casting (molding) a metal, such as magnesium.

The metal core 12 is provided with a boss portion 14. The boss portion 14 is fixed to a steering shaft (not shown in the diagram) configuring a vehicle direction manipulation device (a vehicle steering device). A rim metal core portion 20 (being an element falling within the broad definition of "outer peripheral metal core portion"), configuring a portion of the metal core 12, is provided at the outer periphery of the boss portion 14. The rim metal core portion 20 is formed in a substantially ring shape in front view, provided so as to face the driver's seat. The rim metal core portion 20, as shown in FIG. 2, is formed in substantially a C-shape in cross-section when cut along the steering axial direction, with two legs open toward the bottom side of the steering axis (the direction of arrow B). There is a weight 22 configuring the metal core 12 and fitted into the rim metal core portion 20, the weight 22 being formed in substantially a ring shape in front view (not shown in the diagram).

There are plural (a total of four in the present exemplary embodiment) spokes 16 (these being elements falling within the broad definition of "coupling portions"), serving as a portion of the metal core 12, provided between the boss portion 14 and the rim metal core portion 20, as shown in FIG. 1. The boss portion 14 and the rim metal core portion 20 are coupled together and integrated through the spokes 16, such that the steering shaft (not shown in the diagrams), to which the boss portion 14 is fixed, can be rotated about the steering axis by rotating the rim metal core portion 20 about the axial line of the rim.

A wound leather portion 24 is provided at both the left and right side of the steering wheel 10, when viewed in front. The wound leather portion 24 is attached to the spokes 16 and to the rim metal core portion 20, in a state of covering the locations at the rim metal core portion 20 side of each of the spokes 16 and locations at both the left and right sides of the rim metal core portion 20.

A wood member 30 is provided at top and bottom portions of the steering wheel 10 when viewed in front, for the purpose of decoration and the like. The wood member 30 forms a cylindrical (tube) shape bending (curving) around in a circular arc to correspond to the rim metal core portion 20. The wood member 30 is, as shown in FIG. 2, configured from a wood upper 30A and a wood lower 30B, as plural wooden pieces. The wood upper 30A and the wood lower 30B are formed as a pair from a wood material (a pure wooden material of natural wood). One of the wooden pieces, the wood upper 30A, is disposed at the top side of the steering axis (in the direction of arrow A) and the other of the wooden pieces, the wood lower 30B, is disposed at the bottom side of the steering axis (in the direction of arrow B).

A groove portion 34A is formed in the wood upper 30A in substantially a circular arced concave shape, when viewed in cross-section orthogonal to the length direction thereof (the cross-sectional view of FIG. 2). A groove portion 34B is formed in the wood lower 30B in substantially a rectangular shape, when viewed in cross-section orthogonal to the length direction thereof (the cross-sectional view of FIG. 2), so as to face the groove portion 34A. Facing surfaces 130A, 130B of the wood upper 30A and the wood lower 30B, which are in mutual surface contact, are bonding surfaces, and the facing surfaces 130A, 130B are bonded (joined) to each other with an adhesive. Thereby, the groove portions 34A, 34B are combined with each other, and a through hole 32 is formed piercing through inside of the wood member 30, the through hole 32 being of a substantially rectangular shape in cross-section. Namely, an internal face 32A of the through hole 32 of the wood member 30 is configured by the groove portions 34A, 34B. The rim metal core portion 20 (the metal core 12) is accommodated so as to pass through within the through hole 32 inside the wood member 30. In other words, the wood member 30 covers the rim metal core portion 20.

There is a clearance (gap) 26 between the internal face 32A of the wood member 30 and the rim metal core portion 20, of a specific width (in the present exemplary embodiment, for example, about 1.0 mm) so as to surround the periphery of the rim metal core portion 20 when viewed in the cross-section of FIG. 2. Therefore, when there is relative movement caused by expansion or contraction of the rim metal core portion 20 and the wood member 30, due to changes in the external temperature and humidity, the clearance 26 accommodates such relative movement.

A elastic adhesives 28 (such as an elastomer resin, an element falling within the broad definition of "impact absorbing member having adhesive force") is interposed between the internal face 32A of the through hole 32 of the wood member 30 and the rim metal core portion 20 (metal core 12). Each elastic adhesive 28 has the ability to bond to wood and to metal, and extends in a belt shape along the length direction of the wood member 30 (the circular arc direction as seen in FIG. 1), bonding the internal face 32A of the wood member 30 and the rim metal core portion 20 (metal core 12). The wood member 30 is thereby elastically fixed to the rim metal core portion 20.

The elastic adhesive 28 has a specific amount of elasticity. Therefore, when there is relative movement caused by expansion or contraction of the rim metal core portion 20 and the wood member 30, due to changes in the external temperature and humidity, the elastic adhesive 28 expands or contracts in accordance with the relative movement of the rim metal core portion 20 and the wood member 30. The steering wheel 10 of the present exemplary embodiment is configured such that relative movement of the rim metal core portion 20 and the wood member 30 is permitted by the expansion or contraction of the elastic adhesive 28, while the internal face 32A of the wood member 30 is prevented or suppressed from separating away from the rim metal core portion 20.

Spacer members (or spacing means) 36 are also disposed (placed) at points (are sprinkled) between the internal face 32A of the through hole 32 of the wood member 30 and the rim metal core portion 20 (metal core 12). The spacer members 36 have elasticity and are attached by bonding to the rim metal core portion 20 (metal core 12), so as to position the wood member 30 with respect to the rim metal core portion 20 (metal core 12). The spacer members 36 as elastic bodies in the present exemplary embodiment are formed of the same material as the elastic adhesive 28, and the coefficient of elasticity of the spacer members 36 in the final product state of the steering wheel 10 is set so as to be the same as the coefficient of elasticity of the elastic adhesive 28. The steering wheel 10 has the spacer members 36 provided as point manner rather than line manner, as described above, and the steering wheel 10 is therefore configured such that even if it is supposed that the spacer members 36 were to be compressed during bonding of the wood upper 30A to the wood lower 30B due to dimensional errors or the like, reaction force from the spacer member 36 side is suppressed, and there is no impediment to bonding the wood upper 30A and the wood lower 30B.

Procedure of Steering Wheel Manufacture and Operation and Effects Explanation will now be given of the procedure of manufacture of the steering wheel 10 (assembly sequence of the rim metal core portion 20 and the wood member 30), and the operation and effects thereof.

Figure 3A:
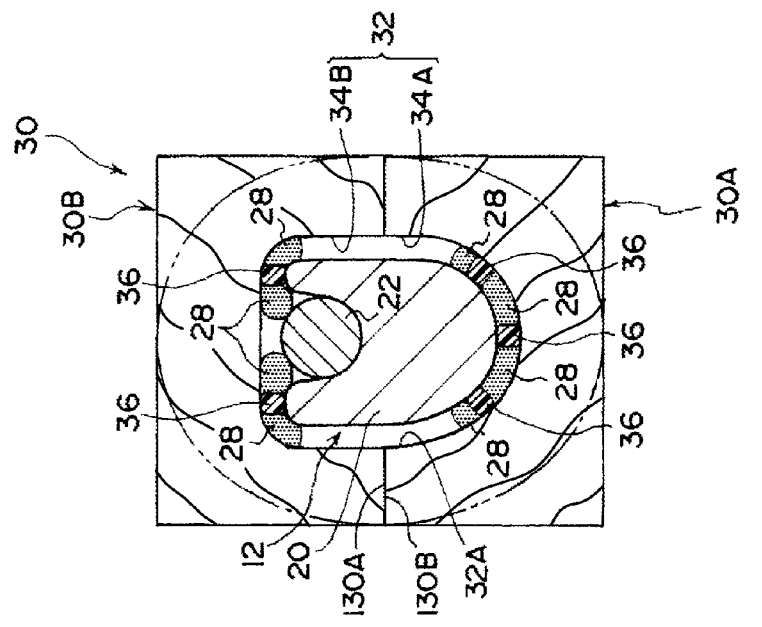
Figure 3B:
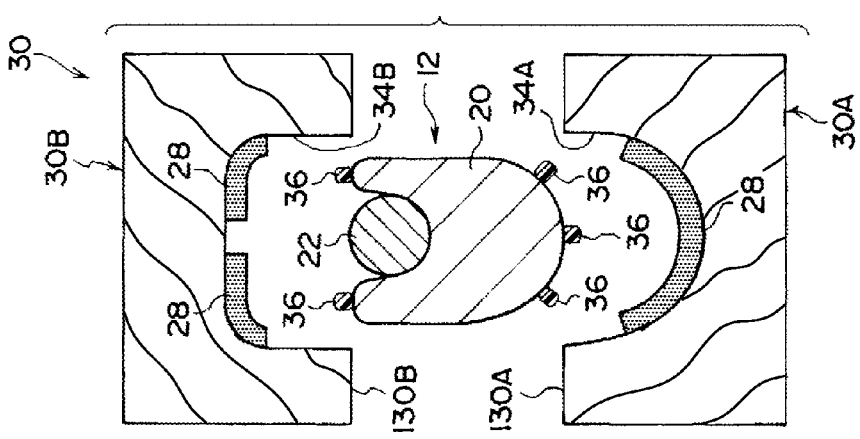
Figure 3C:
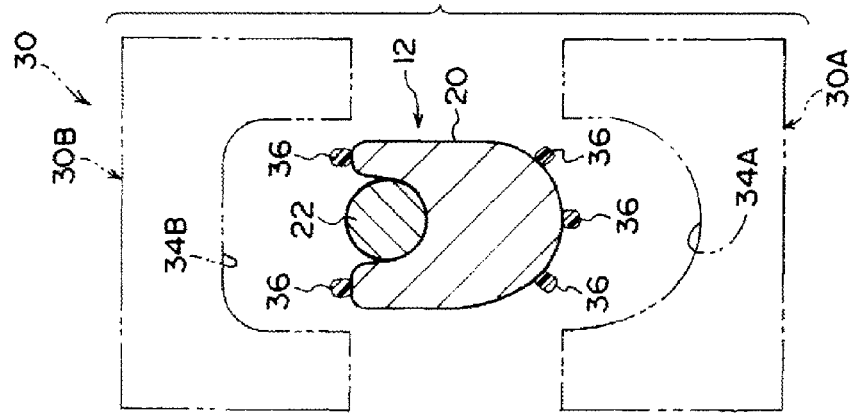

Processes of procedure of assembling of the rim metal core portion 20 and the wood member 30 are shown in FIGS. 3A to 3C. In prior processes to the processes shown in FIGS. 3A to 3C, the wood upper 30A and the wood lower 30B are each formed with a circular arc following the shape of the rim metal core portion 20, and the groove portion 34A is also formed in the wood upper 30A and the groove portion 34B is formed in the wood lower 30B, along the length directions thereof (circular arc shapes).

First, in the spacer attachment process, as shown in FIG. 3A, the spacer members 36 are attached to the rim metal core portion 20 (metal core 12). The spacer members 36 are, as described above, used for positioning the wood member 30 (the wood upper 30A and the wood lower 30B) with respect to the rim metal core portion 20 (metal core 12), and are formed from the same material as the elastic adhesive 28. The spacer members 36 that have been hardened (cured) in advance into bead shapes (grain shapes) before bonding are bonded at points on the rim metal core portion 20. In the present exemplary embodiment, the spacer members 36 are present at points, as seen in the cross-section of FIG. 3A, at the sides of the four corners (for example, substantially sharpened shape portions) of the rim metal core portion 20, and also at the apex portion of the rim metal core portion 20 at the opposite side to the side at which the weight 22 is disposed. Namely, the spacer members 36 are positioned so as to be present in locations enabling the stable positioning of the wood member 30 (the wood upper 30A and the wood lower 30B) relative to the rim metal core portion 20. The spacer members 36 are also present at points with intervals therebetween around the peripheral direction of the rim metal core portion 20, as viewed in the front in FIG. 1.

Next, as shown in FIG. 3B, in the applying (coating) process following the spacer attachment process, the elastic adhesive 28 in a pre-cured state is applied (in a flowable state) onto the groove portion 34A of the wood upper 30A and the groove portion 34B of the wood lower 30B. The elastic adhesive 28, which is initially a flowable body, is a bonding member for bonding the rim metal core portion 20 (metal core 12) and the wood member 30 (the wood upper 30A and the wood lower 30B). In the present exemplary embodiment, the elastic adhesive 28 is coated in a belt shape along each length direction of the groove portion 34A of the wood upper 30A and the groove portion 34B of the wood lower 30B, so as to coat the groove bottom circular arc portion (central portion) of the groove portion 34A of the wood upper 30A, and to coat the corner portions (total of two locations) of the groove portion 34B of the wood lower 30B, as seen in the cross-section of FIG. 3B.

Next, as shown in FIG. 3C, in the assembly process following the spacer attachment process and the coating process, the wood upper 30A and the wood lower 30B (plural wooden pieces) are joined so as to be mutually bonded together, and the rim metal core portion 20 (metal core 12) is accommodated within the through hole 32 inside the wood member 30. When this is being carried out, the wood member 30 is positioned with respect to the rim metal core portion 20 (metal core 12) by the spacer members 36 (in other words, the rim metal core portion 20 is centered within the through hole 32 of the wood member 30 by the spacer members 36). Consequently, misalignment (dislocation) of the relative position of the wood member 30 and the rim metal core portion 20 (metal core 12) is suppressed in the period until the elastic adhesive 28 has cured and become a rubber state. As a result the wood member 30 is assembled to the rim metal core portion 20 (metal core 12) with the elastic adhesive 28 interposed therebetween, in a state in which the rim metal core portion 20 (metal core 12) passes through a central portion of the through hole 32 of the wood member 30.

After this assembly process, the wood member 30 (the wood upper 30A and the wood lower 30B) is machined (a carving away) to the designed profile shown by the double dashed lines in FIG. 3C (substantially ellipse shape in cross sectional view). Since misalignment, of the relative position of the wood member 30 and the rim metal core portion 20, is suppressed when this is carried out, the wall thickness of the wood member 30 is substantially uniform after machining. This results in suppression of variation of the strength of the wood member 30 (securing stability in strength).

In the present exemplary embodiment, as explained above, the spacer members 36 are disposed so as to be present at points (in point manner) between the wood member 30 and the rim metal core portion 20 (metal core 12), and the coefficient of elasticity of the spacer members 36 is also set to be the same as the coefficient of elasticity of the elastic adhesive 28 after curing. Therefore, reaction force by the spacer members 36 is suppressed when a load acts on the after-cure elastic adhesive 28 and the spacer members 36, and so the wood member 30 and the rim metal core portion 20 are maintained in an elastically connected state by the elastic adhesive 28 even though the spacer members 36 are disposed (maintaining an elastically fixed function). Relative movement, when the wood member 30 and the rim metal core portion 20 expand or contract, is thereby allowed (permitted) between the wood member 30 and the rim metal core portion 20 in a state in which reaction force due to the spacer members 36 is suppressed.

As explained above, according to the steering wheel 10 and the manufacturing method of the steering wheel 10 of the present exemplary embodiment, misalignment of the relative position of the wood member 30 and the rim metal core portion 20 can be prevented or suppressed for the period until the elastic adhesive 28 is cured.

Second Exemplary Embodiment

Figure 4:
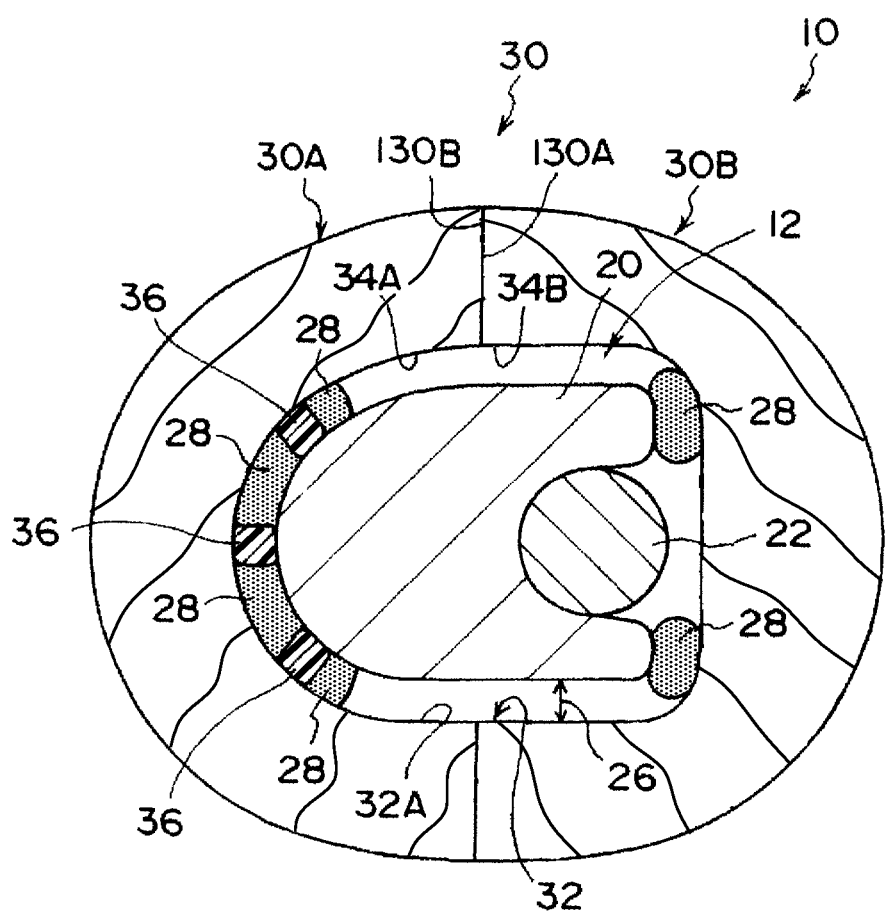
FIG. 4 is a cross-section showing some important elements of a steering wheel according to a second exemplary embodiment of the present invention.
Figure 5C:
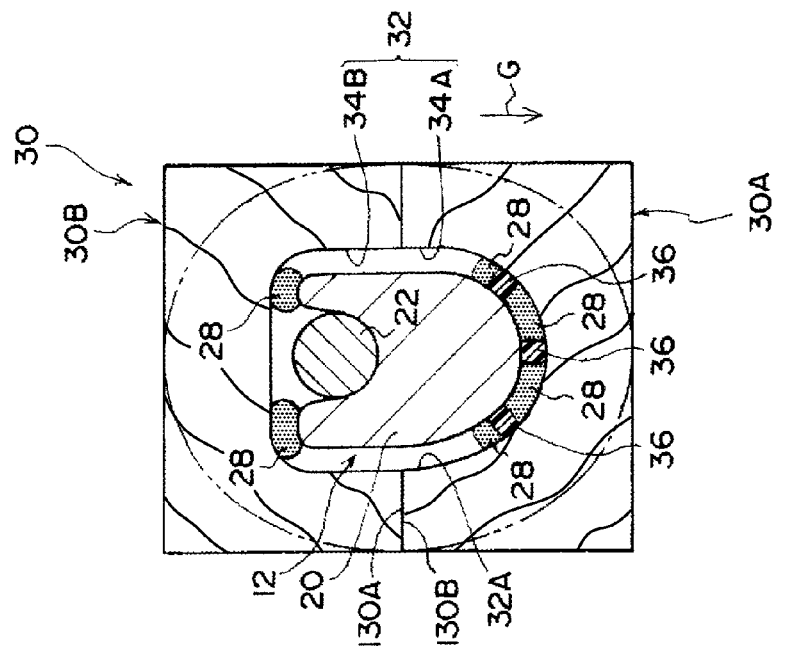
Figure 5B:
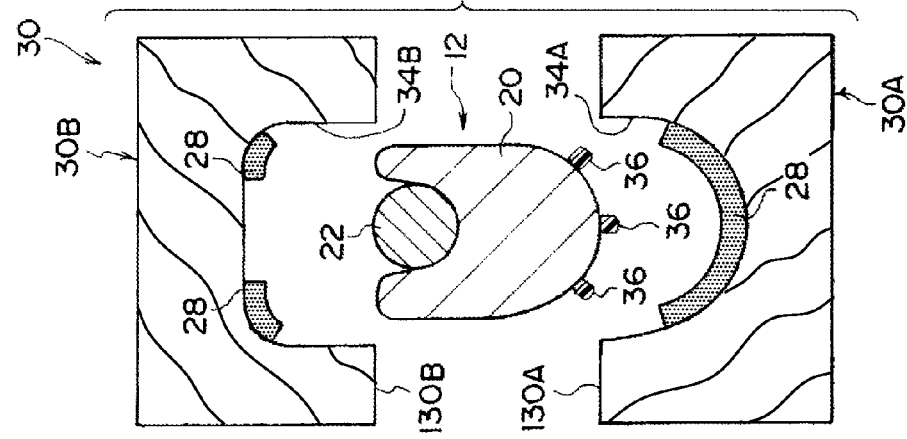
Figure 5A:
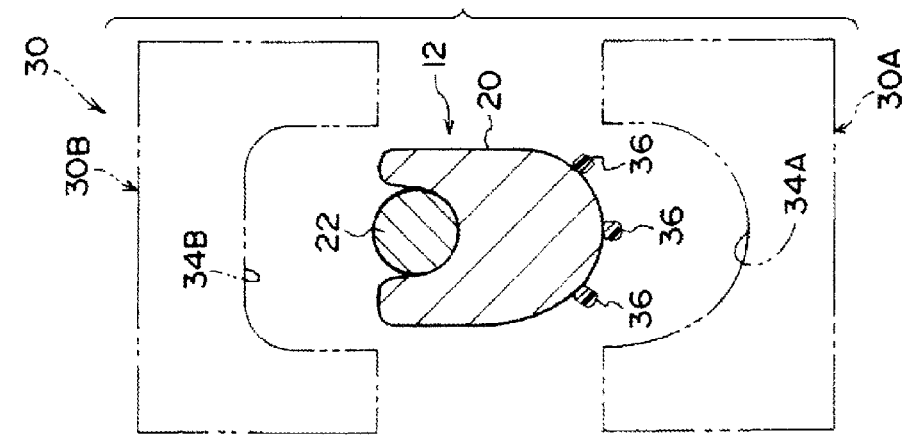

Explanation will now be given of the steering wheel and steering wheel manufacturing method of a second exemplary embodiment of the present invention, with reference to FIG. 4 and FIGS. 5A to 5C. A cross-section showing some important elements of a steering wheel according to the second exemplary embodiment of the present invention is shown in FIG. 4 (corresponding to FIG. 2 of the first exemplary embodiment). Process diagrams showing cross-sections of a manufacturing method of a steering wheel according to the second exemplary embodiment of the present invention are shown in FIGS. 5A to 5C (corresponding to FIGS. 3A to 3C of the first exemplary embodiment). The steering wheel and steering wheel manufacturing method of the second exemplary embodiment differ from the steering wheel and steering wheel manufacturing method of the first exemplary embodiment in that the spacer members 36 are not disposed between the wood lower 30B and the rim metal core portion 20. Other configurations are substantially the same as that of the first exemplary embodiment. Therefore parts of the configuration essentially the same as those of the first exemplary embodiment are allocated the same reference numerals and explanation thereof is omitted. The processes before the processes shown in FIGS. 5A to 5C are similar to the processes before those shown in FIGS. 3A to 3C of the first exemplary embodiment.

As shown in FIG. 4, the spacer members 36 are not disposed between the wood lower 30B and the rim metal core portion 20, but are only disposed at points between the wood upper 30A and the rim metal core portion 20. These spacer members 36 are also present at points with intervals therebetween around the peripheral direction of the rim metal core portion 20 when viewed in front, as shown in FIG. 1.

Explanation will now be given of the procedure of manufacture of the steering wheel 10 (assembly procedure of the wood member 30 to the rim metal core portion 20), and of the operation and effects thereof.

First, in the spacer attachment process, as shown in FIG. 5A, the spacer members 36 are attached to the rim metal core portion 20 (metal core 12). In the present exemplary embodiment, the spacer members 36 are attached to the rim metal core portion 20 only at the side thereof to be accommodated in the wood upper 30A. More specifically, if the wood upper 30A accommodates the rim metal core portion 20 from below (see FIG. 5C), the spacer members 36 are fixed in positions such that the rim metal core portion 20 is centered within the through hole 32 of the wood member 30 of the rim metal core portion 20 in receiving the weight of the rim metal core portion 20 itself.

Next, as shown in FIG. 5B, in the applying (coating) process following the spacer attachment process, the groove portion 34A of the wood upper 30A and the groove portion 34B of the wood lower 30B are coated with elastic adhesive 28 in a pre-cured state (in a flowable state). The positions coated by the elastic adhesive 28 are substantially the same as the positions of the first exemplary embodiment (see FIG. 3B).

Next, as shown in FIG. 5C, in the assembly process following the spacer attachment process and the coating process, the wood upper 30A and the wood lower 30B (plural wooden pieces) are joined by bonding together, and the rim metal core portion 20 (metal core 12) is accommodated within the through hole 32 which is formed inside the wood member 30. When this is being carried out, the wood member 30 is disposed with the wood upper 30A at the bottom and the wood lower 30B at the top, and this orientation is maintained. In this state, the rim metal core portion 20 (metal core 12) is pushed down under its own weight in the direction of gravity (direction of arrow G) and the rim metal core portion 20 (metal core 12) is centered within the through hole 32 of the wood member 30 by the spacer members 36. By this, the wood member 30 is thereby positioned with respect to the rim metal core portion 20 (metal core 12), and misalignment of the relative position of the wood member 30 and the rim metal core portion 20 is thereby suppressed in the period until the elastic adhesive 28 has cured and become a rubber state. Machining processes after the assembly process are similar to those of the first exemplary embodiment (see, FIG. 3C).

A similar effect to that of the above first exemplary embodiment is also achieved by the present exemplary embodiment, as explained above. In the present exemplary embodiment, by only disposing the spacer members 36 at the one side of the rim metal core portion 20 (metal core 12) that is pushed by its own weight, thus it is possible to omit disposing of spacer members 36 on the other side, the opposite side to that of the direction of gravity.

Additional Explanation of the Exemplary Embodiments

In the steering wheel 10 and the manufacturing method of the steering wheel 10 in the above exemplary embodiments, application is made to configurations in which the wood member 30 covers the rim metal core portion 20, however the steering wheel and steering wheel manufacturing method may also be applied to configurations in which a wooden member covers a rim metal core portion and a portion of spoke portions (configurations, for example, in which wooden members are disposed in place of the wound leather portions 24 of FIG. 1).

In the steering wheel 10 and the manufacturing method of the steering wheel 10 in the above exemplary embodiments, the elastic adhesive 28 is used as adhesive, however any adhesive having no-elasticity in the cured state may be used as the adhesive.

In the above exemplary embodiment, the spacer members 36 shown in FIG. 2 etc. are bonded to the rim metal core portion 20 (metal core 12), however the spacer members may be attached onto the metal core by sticky way or the like, instead of bonding way. The spacer members may also be attached only to the wooden member (to the grooved portion of the wooden piece), or may be attached to both the wooden member (to the grooved portion of the wooden piece) and the metal core. The steering wheel may also be configured such that the spacer members disposed between the wooden member and the metal core are not attached to the wooden member and the metal core (for example, so as to be nipped between the wooden member and the metal core).

In the above exemplary embodiments, the spacer members 36 shown in FIG. 2 etc. are formed from the same material as that of the elastic adhesive 28, and, in finished product state of the steering wheel 10 (the state after curing the elastic adhesive), the coefficient of elasticity of the spacer members 36 is set to be the same as the coefficient of elasticity of the elastic adhesive 28 of after-cure. However, spacer members formed, for example, from a different elastic material to that of the adhesive are applicable (for example, an elastic body formed from rubber or the like, or a sticky tape which is cut to a specific size). Or spacer members may also be used in which the coefficient of elasticity of the spaces is set lower than the coefficient of elasticity of the adhesive of after-cure.

In addition, in the manufacturing method of the steering wheel 10 according to the above exemplary embodiments, as shown in FIGS. 3A to 3C and FIGS. 5A to 5C, the coating process (see FIG. 3B and FIG. 5B) is performed after the spacer attachment process (see FIG. 3A and FIG. 5A), however the spacer attachment process and the coating process may be executed at the same time, or the spacer attachment process may be executed after the coating process, depending on factors such as the characteristics of the adhesive.

In the manufacturing method of the steering wheel 10 according to the first exemplary embodiment, the elastic adhesive 28 in a pre-cured state is coated to the groove portion 34A of the wood upper 30A and to the groove portion 34B of the wood lower 30B in the coating process shown in FIG. 3B, however, in the coating process, the coating of the elastic adhesive in a pre-cured state may be made only to the metal core, or the elastic adhesive in the pre-cured state may be coated to both the metal core and the groove portion.

In the manufacturing method of the steering wheel 10 according to the second exemplary embodiment, as shown in FIGS. 5A to 5C, the spacer members 36 are attached to positions on the rim metal core portion 20 (metal core 12) facing the wood upper 30A in the spacer attachment process (see FIG. 5A), and the wood upper 30A of the wood member 30 is disposed at the bottom and the wood lower 30B is disposed at the top in the assembly process (see FIG. 5C). However, for example, it is possible that the spacer members 36 are attached to positions on the rim metal core portion 20 (metal core 12) facing the wood lower 30B in the spacer attachment process, and the wood lower 30B of the wood member 30 is disposed at the bottom and the wood upper 30A is disposed at the top in the assembly process. Namely, by providing spacer members only at the one side of the metal core which side is pushed to the wooden member under gravity or external force, it is possible to omit disposing the spacer members on the other side.

What is claimed is:

1. A steering wheel comprising:
a metal core that is fixed to a steering shaft of a vehicle;
a wooden member that accommodates the metal core therein;
an adhesive that is interposed between the wooden member and the metal core, and bonds the wooden member and the metal core; and
spacer members formed from formed from elastic material that are disposed between the wooden member and the metal core at spaced-apart points with intervals therebetween around a peripheral direction of the metal core, and that position the wooden member with respect to the metal core, the spacer members being in abutting contact with the adhesive, wherein the coefficient of elasticity of the spacer members is set to be the same as, or lower than, the coefficient of elasticity of the adhesive, and wherein the metal core and wooden member are bonded together by the adhesive.

2. The steering wheel of claim 1, wherein the spacer members are formed of the same material as the adhesive.

3. The steering wheel of claim 1, wherein
the wooden member is configured by a plurality of wooden pieces and grooved portions configuring an internal face of the wooden member are respectively formed in the plurality of wooden pieces, and
the spacer members are disposed between the metal core and only the grooved portion of one of the plurality of wooden pieces.

4. The steering wheel of claim 1, wherein
the wooden member is configured by a plurality of wooden pieces and grooved portions configuring an internal face of the wooden member are respectively formed in the plurality of wooden pieces, and
the spacer members are disposed between the metal core and the grooved portion of one of the plurality of wooden pieces, and between the metal core and the grooved portion of another of the plurality of wooden pieces.

5. The steering wheel of claim 1, wherein the spacer members are disposed at vicinity of at least one of corner portions or apex portions of the metal core or at vicinity of portions of the wooden member corresponding to the at least one of corner portions or apex portions of the metal core in the cross sectional view of the metal core.

6. The steering wheel defined in claim 1, wherein all of the spacer members are in abutting contact with the adhesive.

7. A steering wheel comprising:
a metal core that is fixed to a steering shaft of a vehicle;
a wooden member that accommodates the metal core therein;
an adhesive that is interposed between the wooden member and the metal core that bonds the wooden member and the metal core when cured into a hardened state; and
spacing means disposed between the wooden members and the metal core for maintaining a desired position between the wooden member with respect to the metal core when the adhesive is in a pre-cured, flowable state and the wooden member is joined to the metal core, the spacing means being formed from an elastic material and being in abutting contact with the adhesive;
wherein a coefficient of elasticity of the spacing means is set to be the same as, or lower than, a coefficient of elasticity of the cured, hardened adhesive, and
wherein the metal core and wooden member are bonded together by the adhesive.

8. The steering wheel defined in claim 7, further comprising a plurality of spacing means.

9. The steering wheel defined in claim 8, wherein all of the spacing means are in abutting contact with the adhesive.

* * * * *